United States Patent [19]

Warren

[11] Patent Number: 5,186,201
[45] Date of Patent: Feb. 16, 1993

[54] CHECK VALVES

[75] Inventor: William E. Warren, Potters Bar, England

[73] Assignee: British Technology Group Limited, London, England

[21] Appl. No.: 678,987

[22] PCT Filed: Sep. 5, 1990

[86] PCT No.: PCT/GB90/01370
§ 371 Date: Apr. 30, 1991
§ 102(e) Date: Apr. 30, 1991

[87] PCT Pub. No.: WO91/03408
PCT Pub. Date: Mar. 21, 1991

[30] Foreign Application Priority Data

Sep. 8, 1989 [GB] United Kingdom ............... 8920365

[51] Int. Cl.$^5$ .............................................. B65D 83/56
[52] U.S. Cl. .................... 137/38; 222/402.19; 222/500
[58] Field of Search ........... 222/402.1, 402.18, 402.19, 222/500; 137/38, 43

[56] References Cited

U.S. PATENT DOCUMENTS

| | | | |
|---|---|---|---|
| 2,425,313 | 8/1947 | Hammerstein | 222/500 |
| 3,542,254 | 11/1970 | Samuelson | 222/402.19 |
| 4,117,958 | 10/1978 | Spitzer | 137/38 X |
| 4,723,725 | 2/1988 | Comment | 239/533.1 X |
| 4,776,498 | 10/1988 | Maerte | 222/402.19 X |
| 4,940,170 | 7/1990 | Ginsbach | 222/500 |
| 5,042,697 | 8/1991 | Warren | 222/402.1 |

FOREIGN PATENT DOCUMENTS

| | | |
|---|---|---|
| 0332389 | 9/1989 | European Pat. Off. . |
| 1955397 | 7/1970 | Fed. Rep. of Germany . |
| 2480396 | 10/1981 | France . |
| 217703 | 6/1924 | United Kingdom . |
| 944981 | 12/1963 | United Kingdom . |
| 1049135 | 11/1966 | United Kingdom . |
| 2216634 | 11/1989 | United Kingdom . |

Primary Examiner—Robert G. Nilson
Attorney, Agent, or Firm—Cushman, Darby & Cushman

[57] ABSTRACT

A check valve (170) for the discharge passageway of an aerosol dispensing package, comprising: a chamber (171) having inlet and outlet openings (175,174) for in-line connection in the passageway; a dished seat (176) extending across the chamber between the openings with its dished surface facing towards the outlet opening; and a ball (177) housed in the chamber for free movement between substantial sealing engagement with the outlet opening and direct engagement in the seat; the ball being gravitationally engaged in the seat when the chamber is in a generally upright position with the outlet opening uppermost, the seat acting to deflect discharge flow through the chamber around the ball in these last circumstances, and the dished surface being outwardly divergently shaped to cause the ball to roll therefrom under gravity and move to its outlet opening sealing engagement when the chamber is inclined from the upright position by a substantially predetermined angle towards a horizontal disposition.

6 Claims, 1 Drawing Sheet

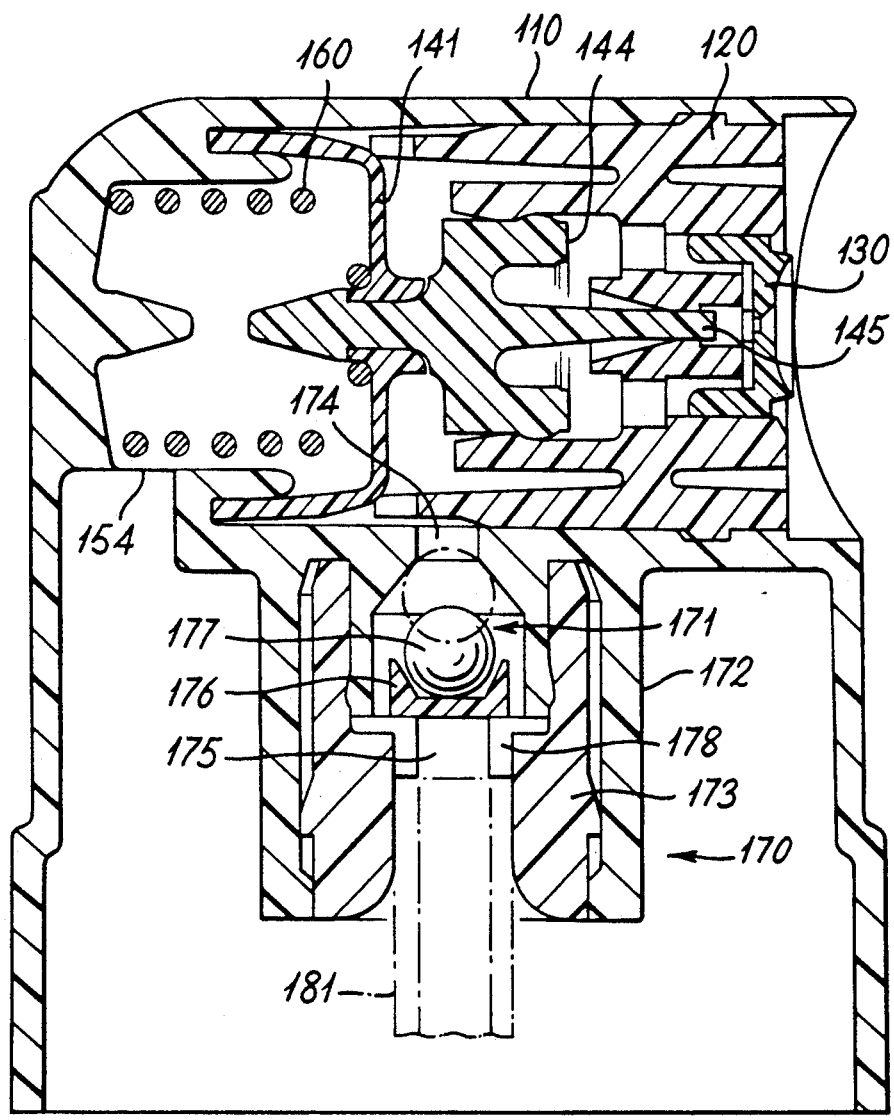

CHECK VALVES

BACKGROUND AND SUMMARY OF THE INVENTION

This invention concerns check valves and more particularly check valves for use in aerosol dispenser packages which employ compressed rather than liquified gas propellants.

Preferably, packages of this kind will involve a regular as well as an ON/OF actuator valve, the regulator serving to control product dispensing from the package to a generally constant flow rate. In the absence of such regulation the flow rate will initially be high and thereafter progressively reduce, with the propellant pressure, as product is dispensed from the package and the propellant expands to fill the package. This is not compatible with the maintenance of a consistent spray pattern and other discharge characteristics appropriate for many of the products made available in aerosol dispenser packages.

One proposal for a regulator for this purpose is described in Patent Specification GB 2,216,634A.

In any event, whether the package includes a flow regulator or not, it is desirable that an additional check valve be provided to reduce the loss of propellant which can otherwise occur with actuation of the package when tilted significantly from an upright disposition. In this connection it is to be noted that the actuator valve will normally communicate with the package interior by way of a dip tube of which the free end is located in the lowermost region of the package to be submerged in the product substantially throughout total dispensing of the latter with the package upright. Inversion of the package will, of course, expose the free end of the dip tube to propellant gas and actuation in these circumstances simply releases such gas to atmosphere to no useful end. In fact such actuation is counterproductive in that it can lead to an exhaustion of propellant before the product in the package has been substantially wholly dispensed, and such a situation can occur more readily with use of a compressed gas propellant which is an inherently more limited resource for a given package and product volume than is the case for a liquified gas propellant. Moreover, such a loss of propellant can occur with a lesser inclination of the package relative to the upright disposition as the product volume remaining in the package is progressively reduced by discharge.

The above-mentioned Specification in fact proposes that a check valve for this purpose should be of a general form comprising a chamber having inlet and outlet openings, and a ball housed in the chamber for movement towards and away from the outlet opening, with the ball and outlet opening being formed for mutual substantial sealing engagement. In use of this valve in the Application, the inlet and outlet openings are respectively communicated with the actuator valve outlet and regulator inlet, and with the valve disposed so that the ball is normally disengaged from the outlet by gravitational force. Operation is such that the ball is moved into sealing engagement with its outlet by flow through the valve if the package is actuated when inclined significantly from the upright when, at the same time, the valve-opening effect of gravitational force on the ball is reduced.

The prior Specification proposes more specifically that its check valve have an outwardly convergently tapered outlet opening better to effect sealing engagement with the ball, and a chamber of telescopic form whereby release of the ball from such engagement is facilitated in the event of a tendency to stick. However, this is not germane to the present consideration.

Difficulty can arise with a check valve of the general form just discussed when the actuator valve is first operated because it is not primed and there is little resistance to initial flow. In these circumstances the initial surge may be so large that the ball can be moved by this alone to seal its outlet upon actuation of the package when at or close to an upright disposition. Surges at subsequent actuations can give the same effect.

An object of the present invention is to reduce this last difficulty and, to this end, there is provided a check valve for the discharge passageway of an aerosol dispensing package, comprising:

a chamber having inlet and outlet openings for in-line connection in said passageway;

a dished seat extending across said chamber between said openings with its dished surface facing towards said outlet opening; and a ball housed in said chamber for free movement between substantial sealing engagement with said outlet opening and direct engagement in said seat;

said ball being gravitationally engaged in said seat when said chamber is in a generally upright position with said outlet opening uppermost, said seat acting to deflect discharge flow through said chamber around said ball in these last circumstances, and said dished surface being outwardly divergently shaped to cause said ball to roll therefrom under gravity and move to said sealing engagement when said chamber is inclined from said upright position by a substantially predetermined angle towards a horizontal disposition.

Also, the proposed valve preferably involves a chamber of telescopic form as more specifically proposed in the aforementioned Specification.

BRIEF DESCRIPTION OF THE DRAWING

For purposes of clarification the invention is described below, by way of example, with reference to the accompanying drawing which shows a presently preferred embodiment, wherein the disposition of the ball within said dished seat is illustrated.

DETAILED DESCRIPTION OF THE INVENTION

The illustrated embodiment shows the relevant valve according to the invention as part of an integrated assembly which also includes a regulator for use in an aerosol dispenser package employing compressed gas propellant. In fact the assembly represents that illustrated in FIG. 4 of the prior Application including an actuator button 110 in which is mounted an assembly of regulator 120, spray nozzle 130 and check valve 170, with the button and its contents being mounted, in turn, by way of the valve 170, on the stem 181 of an actuator valve (not shown) for a related package. The details of the regulator in respect of construction and operation are not germane to the present invention but, if desired, are available from the relevant Application. The valve 170, however, is modified to accord with the present invention.

The valve 170 includes a chamber 171 formed by two parts 172, 173 each of generally tubular form and interconnected for sealed limited mutual telescoping movement. Part 172 is formed with the button and defines an outlet opening 174 of convergently tapered form communicated with the regulator inlet. Part 173 is connected with the stem 181 of the actuator valve (not shown) of a related package and defines an inlet opening 175 communicating the chamber with the actuator valve outlet through stem 181. Part 173 is formed with a structure extending transversely across its interior, which structure includes a seat 176 to render captive within the chamber a ball 177 of greater diameter than the outlet opening 174. The seat is of dished form with its dished surface orientated towards the outlet opening, dimensioned to receive the ball, and having an annular side portion of conical shape. The seat is spaced within the chamber by connection with the part 173 through ribs 178 which extend inwardly and axially along such part, below the seat and in circumferentially spaced manner, to maintain a flow path into the chamber and around the seat.

In operation, actuation of the button pushes the stem 181 to open the related valve and release pressurised fluent material from the package. If the package is generally upright, this material will be product to be dispensed and such product will pass into the check valve, around the seat without disturbing the ball, and thence through the regulator and spray nozzle to atmosphere. If, on the other hand, the package is significantly inclined from the upright towards the horizontal when actuated, the released material will almost certainly be propellant gas, but the ball will roll from its seat to enter the gas flow and, in consequence, be moved to close the outlet opening and minimise propellant loss. In practice this action will occur substantially when the package is inclined by the complement of the cone angle of the seat because part of the annular side portion of the dished surface is then horizontally disposed.

The telescopic nature of the check valve chamber allows compaction and expansion to occur respectively when the valve is subject to propellant pressure upon package actuation and when not so pressurised upon button release. As described in the prior Specification this facilitates release of the ball in the event that it sticks in the valve outlet opening. Such sticking is, in fact, more likely when the outlet opening is of an outwardly tapered form such as shown in the drawing.

Regarding the extent to which a package can be inclined from an upright disposition before it is appropriate for the check valve to operate to inhibit dispensing: this is clearly a factor which can vary between different package situations. However, as a guide, it is considered that inhibition will normally be appropriate at inclinations in excess of about 65° from the vertical.

Lastly, the invention has been described with reference to the drawing in the context of package disposition and it will be appreciated that the subject check valve will have a correspondingly disposed line of action, as it were.

I claim:

1. A check valve for the discharge passageway of an aerosol dispensing package, comprising:
    a housing defining therein chamber having inlet and outlet openings for in-line connection in said passageway;
    a dished seat extending centrally partway across said chamber between said openings with its dished surface facing towards said outlet opening; and
    a ball housed in said chamber for free movement between substantial sealing engagement with said outlet opening and direct engagement in said seat;
    said ball being gravitationally engaged in said seat when said chamber is in a generally upright position with said outlet opening uppermost, said seat having transverse dimensions at least similar to those of said ball to shield the said ball and acting to deflect discharge flow through said chamber around said ball when engaged in said seat, and said dished surface being outwardly divergently shaped in uniform manner therearound to cause said ball to roll therefrom under gravity and move to said sealing engagement when said chamber is inclined from said upright position by a substantially predetermined angle towards a horizontal disposition.

2. A valve according to claim 1 wherein said dished surface has an annular side portion of conical shape inclined relative to its axis at the complement of said predetermined angle.

3. A valve according to claim 1 or 2 wherein said predetermined angle is about 65°.

4. A valve according to claim 1 wherein said outlet opening is of inwardly convergently tapered form to engage said ball.

5. A valve according to claim 1 wherein said housing is of telescopic form.

6. A check valve for the discharge passageway of an aerosol dispensing package, comprising:
    a housing of telescopic form defining therein a chamber having inlet and outlet openings for in-line connection in said passageway;
    a dished seat extending across said chamber between said openings with its dished surface facing towards said outlet opening; and
    a ball housed in said chamber for free movement between substantial sealing engagement with said outlet opening and direct engagement in said seat;
    said ball being gravitationally engaged in said seat when said chamber is in a generally upright position with said outlet opening uppermost, said seat acting to shield said ball and deflect discharge flow through said chamber around said ball when engaged in said seat, and said dished surface being outwardly divergently shaped to cause said ball to roll therefrom under gravity and move to said sealing engagement when said chamber is inclined from said upright position by a substantially predetermined angle towards a horizontal disposition.

* * * * *